United States Patent [19]
Charbonneau et al.

[11] 4,355,134
[45] Oct. 19, 1982

[54] WHOLLY AROMATIC POLYESTER CAPABLE OF FORMING AN ANISOTROPIC MELT PHASE AT AN ADVANTAGEOUSLY REDUCED TEMPERATURE

[75] Inventors: Larry F. Charbonneau, Chatham; Gordon W. Calundann, North Plainfield, both of N.J.

[73] Assignee: Celanese Corporation, New York, N.Y.

[21] Appl. No.: 270,440

[22] Filed: Jun. 4, 1981

[51] Int. Cl.$^3$ .............................................. C08G 63/60
[52] U.S. Cl. ................................... 524/605; 524/601; 528/125; 528/128; 528/176; 528/190; 528/191; 528/193; 528/194; 528/206; 528/271
[58] Field of Search ............... 528/176, 190, 191, 193, 528/194, 271, 128, 206, 125; 260/40 R, 40 P; 524/601, 605

[56] References Cited

U.S. PATENT DOCUMENTS 4,188,476  2/1980  Irwin ..................................... 528/194
4,224,433  9/1980  Calundann et al. .................. 528/190

Primary Examiner—Lester L. Lee
Attorney, Agent, or Firm—Burns, Doane, Swecker & Mathis

[57] ABSTRACT

An improved wholly aromatic polyester is provided which exhibits an anisotropic melt phase and which is capable of readily undergoing melt processing. The wholly aromatic polyester consists essentially of the recurring units (a) p-oxybenzoyl moiety, (b) 2,6-dioxynaphthalene moiety, (c) 2,6-dioxyanthraquinone moiety, and (d) terephthaloyl moiety in the concentrations indicated. The resulting polymer is substantially free of aromatic rings possessing ring substitution and meta disposed linkages in the polymer chain. The present invention represents an improvement over the polyester of U.S. Pat. No. 4,184,996 since the melt phase may be formed at an advantageously reduced temperature thereby better facilitating the use of standard melt processing equipment when forming fibers, films, three-dimensional shaped articles, etc. The reduction in possible melt processing temperature is accomplished without any significant diminution in melt anisotropy such as that which would result if non-symmetrical meta disposed linkages were present in the polymer chain. Also, the present polyester does not rely upon the presence of ring substitution as a means for producing the desired melt anisotropy.

22 Claims, No Drawings

WHOLLY AROMATIC POLYESTER CAPABLE OF FORMING AN ANISOTROPIC MELT PHASE AT AN ADVANTAGEOUSLY REDUCED TEMPERATURE

BACKGROUND OF THE INVENTION

Wholly aromatic polyester resins long have been known. For instance, 4-hydroxybenzoic acid homopolymer and copolymers have been provided in the past. Those wholly aromatic polyesters normally encountered in the prior art have tended to be somewhat intractable in nature and to present substantial difficulties if one attempts to melt process the same while employing conventional melt processing procedures. Such polymers commonly are crystalline in nature, relatively high melting or possess a decomposition temperature which is below the melting point. Other amorphous wholly aromatic polyesters when molten frequently exhibit an isotropic melt phase. With the crystalline polymers molding techniques such as compression molding or sintering may be utilized; however, injection molding, melt spinning, etc., commonly have not been viable alternatives or when attempted commonly have been accomplished with difficulty.

Representative publications which discuss wholly aromatic polyesters include: (a) *Polyesters of Hydroxybenzoic Acids*, by Russell Gilkey and John R. Caldwell, J. of Applied Polymer Sci., Vol. II, Pages 198 to 202 (1959), (b) *Polyarylates (Polyesters From Aromatic Dicarboxylic Acids and Bisphenols)*, by G. Bier, Polymer, Vol. 15, Pages 527 to 535 (August 1974), (c) *Aromatic Polyester Plastics*, by S. G. Cottis, Modern Plastics, Pages 62 to 63 (July 1975); and (d) *Poly(p-Oxybenzoyl Systems): Homopolymer for Coatings: Copolymers for Compression and Injection Molding*, by Roger S. Storm and Steven G. Cottis, Coating Plast. Preprint, Vol. 34, No 1, Pages 194 to 197 (April 1974). See also, U.S. Pat. Nos. 3,039,994; 3,169,121; 3,321,437; 3,549,593; 3,553,167; 3,637,595; 3,651,014; 3,723,388; 3,759,870; 3,767,621; 3,778,410; 3,787,370; 3,790,528; 3,829,406; 3,890,256; and 3,975,487.

Also, it more recently has been disclosed that certain polyesters may be formed which exhibit melt anisotropy. See, for instance, (a) *Polyester X7G-A Self Reinforced Thermoplastic*, by W. J. Jackson, Jr., H. F. Kuhfuss, and T. F. Gray, Jr. 30th Anniversary Technical Conference, 1975 Reinforced Plastics/Composites Institute, The Society of the Plastics Industry, Inc., Section 17-D, Pages 1 to 4, (b) Belgian Pat. Nos. 838,935 and 828,936, (c) Dutch Pat. No. 7505551, (d) West German Nos. 2520819, 2520820, 2722120, 2834535, 2834536 and 2834537, (e) Japanese Nos. 43-223; 2132-116; 3017-692; and 3021-293, (f) U.S. Pat. Nos. 3,991,013; 3,991,014; 4,057,597; 4,066,620; 4,067,852; 4,075,262; 4,083,829; 4,093,595; 4,118,372; 4,130,545; 4,130,702; 4,146,702; 4,153,779; 4,156,070; 4,159,365; 4,161,470; 4,169,933; 4,181,792; 4,183,895; 4,184,996; 4,188,476; 4,201,856; 4,219,461; 4,224,433; 4,226,970; 4,230,817; 4,232,143; 4,232,144; 4,238,598; 4,238,599; 4,238,600; 4,245,082; 4,245,084; 4,256,624; 4,265,802; (g) U.K. Application No. 2,002,404; and (h) European Patent Applications 0008855, 0018145. See also commonly assigned U.S. Ser. Nos. 109,575, filed Jan. 4, 1980 (now U.S. Pat. No. 4,285,852); 128,759, filed Mar. 10, 1980 (now U.S. Pat. No. 4,299,756); 128,778, filed Mar. 10, 1980 (now U.S. Pat. No. 4,279,803); 169,014, filed July 15, 1980; and 194,196, filed Oct. 6, 1980.

In commonly assigned U.S. Pat. No. 4,184,996 is disclosed a wholly aromatic polyester which consists essentially of the recurring units (a) p-oxybenzoyl moiety, (b) 2,6-dioxynaphthalene moiety, and (c) terephthaloyl moiety and is free of units which possess ring substitution. As indicated in Example II of this patent, a representative sample of the polyester there claimed was melt extruded while at a temperature of about 355° C.

In U.S. Pat. No. 4,188,476 is disclosed an aromatic polyester consisting essentially of (a) p-oxybenzoyl units, (b) terephthaloyl units, (c) 2,6-dioxynaphthalene or 2,6-dioxyanthraquinone units and (d) non-symmetrical m-oxybenzoyl or 1,3-dioxyphenylene units. There is no suggestion that both 2,6-dioxynaphthalene and 2,6-dioxyanthraquinone units be provided in combination in the resulting aromatic polyester. See also European Patent Application No. 0018145 for a similar disclosure.

In commonly assigned U.S. Pat. No. 4,224,433 to the same inventors as the present application is disclosed an aromatic polyester consisting essentially of (a) 2,6-dioxyanthraquinone moiety, (b) p-oxybenzoyl moiety, and (c) aromatic diacid moiety which includes non-symmetrical 1,3-phenylene radicals and optionally some symmetrical 1,4-phenylene radicals as described.

It is an object of the present invention to provide an improved wholly aromatic polyester which is capable of readily undergoing melt processing.

It is an object of the present invention to provide an improved wholly aromatic polyester which is capable of being melt processed using standard equipment commonly selected for the melt processing of polyethylene terephthalate.

It is an object of the present invention to provide an improved wholly aromatic polyester which is capable of forming a highly anisotropic melt phase even in the absence of relatively expensive moieties which include aromatic ring substitution.

It is an object of the present invention to provide an improved wholly aromatic polyester which is capable of being melt processed to form quality fibers, films, and three-dimensional shaped articles.

It is another object of the present invention to provide an improved wholly aromatic polyester which advantageously can be melt processed at a lower temperature than the corresponding wholly aromatic polyester of U.S. Pat. No. 4,184,996 as described hereafter without resorting to the inclusion of nonsymmetrical meta disposed linkages in the polymer chain which would tend to reduce the overall melt anisotropy of the polyester.

These and other objects, as well as the scope, nature and utilization of the invention will be apparent to those skilled in the art from the following detailed description.

SUMMARY OF THE INVENTION

It has been found that a melt processable wholly aromatic polyester capable of forming an anisotropic melt phase consists essentially of the recurring moieties I, II, III, and IV having the structural formulas wherein:

I is 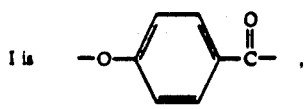

II is 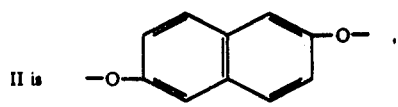

III is 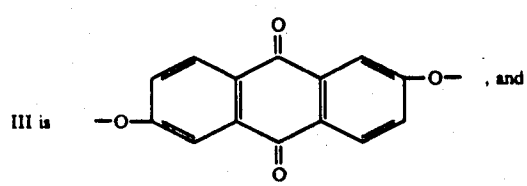, and

IV is 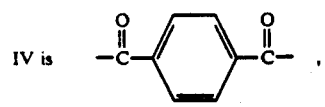, wherein the wholly aromatic polyester is substantially free of aromatic rings possessing ring substitution and meta disposed linkages in the polymer chain, wherein the wholly aromatic polyester comprises approximately 20 to 80 mole percent of moiety I, approximately 5 to 20 mole percent of moiety II, approximately 5 to 20 mole percent of moiety III, and approximately 10 to 40 mole percent of moiety IV, and wherein the wholly aromatic polyester can be melt processed at a lower minimum temperature when compared to a similarly formed wholly aromatic polyester wherein moiety III is omitted and is replaced by an additional concentration of moiety II which corresponds to the concentration of moiety III.

DESCRIPTION OF PREFERRED EMBODIMENTS

The wholly aromatic polyester of the present invention consists essentially of four recurring moieties which when combined as described hereafter have been found to yield a polymeric product which exhibits an anisotropic melt phase which is capable of readily undergoing melt processing. The aromatic polyester is considered to be "wholly" aromatic in the sense that each moiety present in the polyester contributes at least one aromatic ring to the polymer backbone. In preferred embodiments the wholly aromatic polyester is capable of forming an anisotropic melt phase below approximately 300° C., and below approximately 290° C. in particularly preferred embodiments. The resulting polyester accordingly advantageously is capable of being melt processed using standard equipment commonly selected for the melt processing of polyethylene terephthalate. As discussed hereafter, the improved wholly aromatic polyester of the present invention generally can be melt processed at a lower temperature than the corresponding polyester of U.S. Pat. No. 4,184,996.

Each of the moieties of the wholly aromatic polyester is substantially free of aromatic ring substitution and meta disposed rings in the polymer chain such as are present in the polyester of U.S. Pat. No. 4,188,476. Such meta disposed rings tend to impart non-symmetry to the polymer chain and to diminish the degree of anisotropy exhibited by the polymer melt. Additionally, according to the present invention it is not essential to resort to relatively expensive moieties which possess aromatic ring substitution in order to achieve the desired melt anisotropy and concomitant ease of melt processability.

Moiety I of the wholly aromatic polyester is a p-oxybenzoyl moiety and possesses the structural formula:

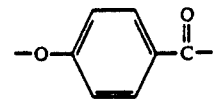

Moiety I comprises approximately 20 to 80 mole percent of the wholly aromatic polyester, and preferably approximately 40 to 60 mole percent. The melting point of the resulting wholly aromatic polyester tends to be further lowered as one incorporates the p-oxybenzoyl moiety in the more preferred quantities.

Moiety II of the wholly aromatic polyester is a 2,6-dioxynaphthalene moiety of the structural formula:

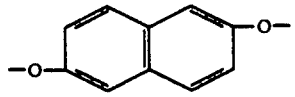

Moiety II comprises approximately 5.0 to 20 mole percent of the wholly aromatic polyester, and preferably approximately 10 to 15 mole percent.

Moiety III of the wholly aromatic polyester is a 2,6-dioxyanthraquinone moiety and possesses the structural formula:

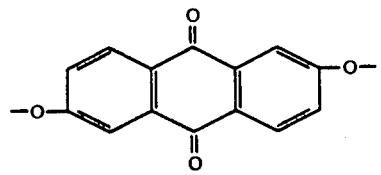

Moiety III comprises approximately 5.0 to 20 mole percent of the wholly aromatic polyester, and preferably approximately 10 to 15 mole percent. 2,6-dihydroxyanthraquinone is available commercially under the common name of anthraflavic acid from Imperial Chemical Industries and others.

Moiety IV of the wholly aromatic polyester is a terephthaloyl moiety of the structural formula:

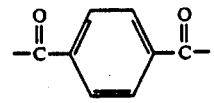

Moiety IV comprises approximately 10 to 40 mole percent of the wholly aromatic polyester, and preferably approximately 20 to 30 mole percent.

In preferred embodiments the molar quantities of moieties II and III are substantially equal to each other. Also, the total molar quantity of moieties II and III is substantially equal to that of moiety IV.

Other ester-forming moieties than those previously discussed additionally may be included in the wholly aromatic polyester of the present invention in a minor concentration so long as such moieties conform to the above criteria and do not adversely influence the desired anisotropic melt phase or otherwise interfere with the melt processability.

The wholly aromatic polyester of the present invention commonly exhibits

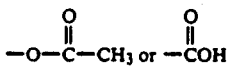

end groups depending upon the synthesis route selected. As will be apparent to those skilled in the art, the end groups optionally may be capped, e.g., acidic end groups may be capped with a variety of alcohols, and hydroxyl end groups may be capped with a variety of organic acids. For instance, end capping units such as phenylester

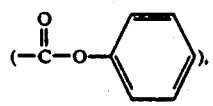

and methylester

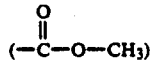

optionally may be included at the end of the polymer chains. The polymer also may be oxidatively cross-linked to at least some degree, if desired, by heating in an oxygen-containing atmosphere (e.g., in air) while in bulk form or as a previously shaped article at a temperature below its melting point for a limited period of time (e.g., for a few minutes).

The wholly aromatic polyesters of the present invention tend to be substantially insoluble in all common polyester solvents, such as hexafluoroisopropanol and o-chlorophenol, and accordingly are not susceptible to solution processing. They can surprisingly be readily processed by common melt processing techniques as discussed hereafter. Some solubility is discernible in pentafluorophenol.

The wholly aromatic polyesters commonly exhibit a weight average molecular weight of about 2,000 to 200,000, and preferably about 10,000 to 25,000, e.g., about 20,000 to 22,000. Such molecular weight may be determined by standard techniques not involving the solutioning of the polymer, e.g., by end group determination via infra red spectroscopy on compression molded films.

The wholly aromatic polyesters additionally commonly exhibit an inherent viscosity (i.e., I.V.) of at least approximately 1 dl./gram, and preferably 2 to 8 dl./gram, when dissolved in a concentration of 0.1 percent by weight in pentafluorophenol at 60° C.

Unlike the aromatic polyesters commonly encountered in the prior art, the wholly aromatic polyesters of the present invention are not intractable and form an anisotropic melt phase whereby order is manifest in the molten polymer. The subject polyester readily forms liquid crystals in the melt phase and accordingly exhibits a high tendency for the polymer chains to orient in the shear direction. Such anisotropic properties are manifest at a temperature which is readily amenable for melt processing in order to form shaped articles. Such anisotropy in the melt may be confirmed by conventional polarized light techniques whereby crossed-polarizers are utilized. More specifically, the anisotropic melt phase may conveniently be confirmed by the use of a Leitz polarizing microscope at a magnification of 40X with the sample on a Leitz hot stage and under a nitrogen atmosphere. The polymer melt is optically anisotropic, i.e., it transmits light when examined between crossed-polarizers. The amount of light transmitted increases when the sample is sheared (i.e., is made to flow); however, the sample is optically anisotropic even in the static state. On the contrary, typical aromatic polyesters do not transmit light to any substantial degree when examined under identical conditions.

The wholly aromatic polyester of the present invention may be formed by a variety of ester-forming techniques whereby organic monomer compounds possessing functional groups which upon condensation form the requisite recurring moieties are reacted. For instance, the functional groups of the organic monomer compounds may be carboxylic acid groups, hydroxyl groups, ester groups, acyloxy groups, acid halides, etc.

The organic monomer compounds may be reacted in the absence of a heat exchange fluid via a melt acidolysis procedure. The monomers are melted in an inert atmosphere. Polymerization can be initiated at approximately 250° C. and the temperature of the melt subsequently is raised. During a final portion of the polymerization a vacuum can be applied to remove volatiles while the temperature is within the range of approximately 300° to 340° C. The polymer product then is recovered.

As set forth in commonly assigned U.S. Pat. No. 4,067,852, of Gordon W. Calundann, entitled "Melt Processable Thermotropic Wholly Aromatic Polyester Containing Polyoxybenzoyl Units" is described a slurry polymerization process which may be employed to form the wholly aromatic polyester of the present invention wherein the solid product is suspended in a heat exchange medium. The disclosure of this copending application is herein incorporated by reference.

When employing either the melt acidolysis procedure or the slurry procedure of U.S. Pat. No. 4,067,852, the organic monomer reactants from which the p-oxybenzoyl moiety (i.e. moiety I), 2,6-dioxynaphthalene moiety (i.e. moiety II), and 2,6-dioxyanthraquinone (i.e. moiety III) are derived may be initially provided in a modified form whereby the usual hydroxyl groups of these monomers are esterified (i.e., they are provided as acyl esters). For instance, lower acyl esters of p-hydroxybenzoic acid, 2,6-dihydroxynaphthalene, and 2,6-dihydroxyanthraquinone wherein the hydroxy groups are esterified may be provided as reactants. The lower acyl groups preferably have from about 2 to about 4 carbon atoms. Preferably the acetate esters of the organic compounds which form moieties I, II and III are provided. Accordingly, particularly preferred reactants for the condensation reaction are p-acetoxybenzoic acid, 2,6-diacetoxynaphthalene, and 2,6-diacetoxyanthraquinone. If minor quantities of other aryl reactants (as previously discussed) optionally provide oxy-units within the resulting polymer, these too preferably are provided as the corresponding lower acyl esters. Relative quantities of organic monomer reactants are provided in the reaction zone so that the potential dicarboxy units and dioxy units available for incorporation in the resulting wholly aromatic polyester are substantially equal.

Representative catalysts which optionally may be employed in either the melt acidolysis procedure or in the procedure of U.S. Pat. No. 4,067,852 include dialkyl tin oxide (e.g., dibutyl tin oxide), diaryl tin oxide, titanium dioxide, alkoxy titanium silicates, titanium alkoxides, alkali and alkaline earth metal salts of carboxylic acids, the gaseous acid catalysts such as Lewis acids (e.g., $BF_3$), hydrogen halides (e.g., HCl), etc. The quantity of catalyst utilized typically is about 0.001 to 1 percent by weight based upon the total monomer weight, and most commonly about 0.01 to 0.2 percent by weight.

The molecular weight of a previously formed wholly aromatic polyester may be further increased via a solid state polymerization procedure wherein the particulate polymer is heated in an inert atmosphere (e.g., in a nitrogen atomosphere) at a temperature of about 260° C. for 10 to 12 hours.

The wholly aromatic polyester of the present invention can be melt processed with ease to form a variety of shaped articles, e.g., fibers, films, molded three-dimensional articles, etc. Such polyester generally can be melt processed at a lower temperature than the polyester of U.S. Pat. No. 4,184,996. For instance, the wholly aromatic polyester of the present invention forms an anisotropic melt phase at a lower minimum temperature when compared to a similarly formed wholly aromatic polyester wherein moiety III is omitted and is replaced by an additional concentration of moiety II which corresponds to the concentration of moiety III. The lower melting temperature advantageously allows the convenient utilization of standard melt processing equipment commonly used for the melt processing of polyethylene terephthalate. The polyesters of the present invention commonly form an anisotropic melt phase at a minimum temperature of about 250° to 290° C. and commonly may be melt processed at a temperature of about 300° to 360° C. The ability to melt process at such lower temperatures reduces equipment costs and minimizes the degradation of the polymer while maintained at the melting temperature.

When forming fibers and films the extrusion orifice may be selected from among those commonly utilized during the melt extrusion of such shaped articles. For instance, the shaped extrusion orifice may be in the form of a rectangular slit (i.e., a slit die) when forming a polymeric film. When forming a filamentary material the spinneret selected may contain one and preferably a plurality of extrusion orifices. For instances, a standard conical spinneret containing 1 to 2000 holes (e.g., 6 to 1500 holes) such as commonly used in the melt spinning of polyethylene terephthalate, having a diameter of about 1 to 60 mils (e.g., 5 to 40 mils) may be utilized. Yarns of about 20 to 200 continuous filaments are commonly formed.

Subsequent to extrusion through the shaped orifice the resulting filamentary material or film is passed in the direction of its length through a solidification or quench zone wherein the molten filamentary material or film is transformed to a solid filamentary material or film. The resulting fibers commonly have a denier per filament of about 1 to 50, and preferably a denier per filament of about 1 to 20.

The resulting filamentary material, film, or three-dimensional shaped article optionally may be subjected to a thermal treatment whereby its physical properties are further enhanced. For instance, the tenacity of the fiber or film generally is increased by such thermal treatment. More specifically, the fibers or films may be thermally treated in an inert atmosphere (e.g., nitrogen, argon, helium) or in a flowing oxygen-containing atmosphere (e.g., air) with or without stress at a temperature below the polymer melting temperature until the desired property enhancement is achieved. Thermal treatment times commonly range from a few minutes to several days. As the fiber is thermally treated, its melting temperature progressively is raised. The temperature of the atmosphere may be staged or continuously increased during the thermal treatment or held at a constant level. For instance, the fiber may be heated at 250° C. for one hour, at 260° C. for one hour, and at 270° C. for one hour. Alternatively, the fiber may be heated at about 15° to 20° C. below the temperature at which it melts for about 48 hours. Optimum heat treatment conditions will vary with the specific composition of the wholly aromatic polyester and with the fiber's process history.

The as-spun fibers formed from the wholly aromatic polyester of the present invention are fully oriented and exhibit highly satisfactory physical properties which render them suitable for use in high performance applications. The as-spun fibers commonly exhibit an average single filament tenacity of at least 5 grams per denier (e.g., about 5 to 15 grams per denier), an average single filament tensile modulus of at least about 300 grams per denier (e.g., about 300 to 1000 grams per denier), and exhibit an extraordinary dimensional stability at elevated temperature (e.g., at temperatures of about 100° to 150° C.). Following thermal treatment (i.e., annealing) the fibers commonly exhibit an average single filament tenacity of at least 10 grams per denier (e.g., 10 to 30 grams per denier), and an average single filament tensile modulus of at least 300 grams per denier measured at ambient conditions (e.g., 72° F. and 65 percent relative humidity). Such properties enable the fibers to be used with particular advantage as tire cords and in other industrial applications, such as conveyor belts, hose, cabling, resin reinforcement, etc. Films formed of the wholly aromatic polyesters of the present invention may be used as strapping tape, cable wrap, magnetic tape, electric motor dielectric film, etc. The fibers and films exhibit an inherent resistance to burning.

A molding compound may be formed from the wholly aromatic polyester of the present invention which incorporates approximately 1 to 60 percent by weight of a solid filler (e.g., talc) and/or reinforcing agent (e.g., glass fibers).

The wholly aromatic polyester also may be employed as a coating material which is applied as a powder or from a liquid dispersion.

The following examples are presented as specific illustrations of the claimed invention. It should be understood, however, that the invention is not limited to the specific details set forth in the examples.

EXAMPLE I

To a three-neck round flask equipped with a stirrer, nitrogen inlet tube, and a distillation head connected to a condenser were added the following:
 (a) 46.55 g. of p-acetoxybenzoic acid (0.258 mole),
 (b) 10.50 g. of 2,6-dihydroxynaphthalene diacetate (0.043 mole),
 (c) 13.94 g. of 2,6-dihydroxyanthraquinone diacetate (0.043 mole), and
 (d) 14.287 g. of terephthalic acid (0.086 mole).

The monomers were melted under an atmosphere of nitrogen. The reactants were then heated at 250° C. for 2 hours, at 280° C. for 1 hour, at 300° C. for 1 hour, and the polymerization was finalized under vacuum (20 mm. Hg) for about 30 minutes at 300° C. The polymer product was ground and was washed with chloroform, and dried.

The polymer product had a second order transition temperature of 100° C. and an inherent viscosity (I.V.) of 2.66 dl./gram when dissolved in a concentration of 0.1 percent by weight in pentafluorophenol at 60° C. The polymer was next solid state polymerized by heating under a flowing nitrogen atmosphere for one day at 200° C. and one day at 225° C. Following the solid state polymerization treatment the polymer exhibited an inherent viscosity (I.V.) of 3.41 dl./gram when dissolved in a concentration of 0.1 percent by weight in pentafluorophenol at 60° C. The inherent viscosity was determined in accordance with the following equation:

$$I.V. = \frac{\ln(\eta\ rel)}{c}$$

where c=concentration of solution (here, 0.1 percent by weight), and $\eta rel$=relative viscosity. The relative viscosity was measured as the ratio of the time required for polymer solution to flow through a viscometer to the time required for the solvent alone to flow through the viscometer. The apparatus used was an Ubbelohde dilution type 100 viscometer.

The resulting polyester exhibited an anisotropic melt phase at a minimum temperature of approximately 250° C.

The wholly aromatic polyester of the present invention while at a relatively low temperature of 330° C. was melt extruded through a spinneret provided with a single hole jet having a diameter of 7 mils and a length of 10 mils. The take-up speed of the monofilament was 688 meters/minute. For comparative purposes a similarly formed polyester wherein the 2,6-dioxyanthraquinone moiety is omitted and the 2,6-dioxynaphthalene moiety is doubled on a molar basis requires a melt extrusion temperature of approximately 360° C.

The resulting as-spun wholly aromatic polyester fiber of the present invention exhibited a denier per filament of 3.11 and the following average single filament properties:

| Tenacity (grams per denier) | 6.5 |
|---|---|
| Modulus (grams per denier) | 620 |
| Elongation (percent) | 1.3 |

EXAMPLE II

Example I was substantially repeated with the exceptions indicated below.

To a three-neck round flask equipped with a stirrer, nitrogen inlet tube, and a distillation head connected to a condenser were added the following:

(a) 36 g. of p-acetoxybenzoic acid (0.2 mole),
(b) 18.3 g. of 2,6-dihydroxynaphthalene diacetate (0.075 mole),
(c) 24.3 g. of 2,6-dihydroxyanthraquinone diacetate (0.075 mole), and
(d) 24.9 g. of terephthalic acid (0.15 mole).

The reactants were gradually heated from 250° C. to 340° C. over a three and one-half hour period, and the polymerization was finalized under vacuum (0.4 mm. Hg) for 30 minutes at 340° C.

The polymer product had a second order transition temperature of 108° C. and an inherent viscosity of 1.44 dl./gram.

The resulting polyester exhibited an anisotropic melt phase at a minimum temperature of approximately 250° C.

The wholly aromatic polyester of the present invention while at a relatively low temperature of 315° C. was melt extruded through a spinneret provided with a single hole jet having a diameter of 7 mils and a length of 10 mils. The take-up speed of the monofilament was 820 meters/minute. For comparative purposes a similarly formed polyester wherein the 2,6-dioxyanthraquinone moiety is omitted and the molar concentration of 2,6-dioxynaphthalene moiety is doubled requires a melt extrusion temperature of approximately 345° C.

The resulting as-spun wholly aromatic polyester fiber of the present invention exhibited a denier per filament of 1.2 and the following average single filament properties:

| Tenacity (grams per denier) | 4.8 |
|---|---|
| Modulus (grams per denier) | 664 |
| Elongation (percent) | 0.97 |

EXAMPLE III

Example I was substantially repeated with the exceptions indicated below.

To a three-neck round flask equipped with a stirrer, nitrogen inlet tube, and a distillation head connected to a condenser were added the following:

(a) 52.4 g. of p-acetoxybenzoic acid (0.291 mole),
(b) 11.85 g. of 2,6-dihydroxynaphthalene diacetate (0.0485 mole),
(c) 15.72 g. of 2,6-dihydroxyanthraquinone diacetate (0.0485 mole), and
(d) 16.11 g. of terephthalic acid (0.097 mole).

The reactants were gradually heated from 250° C. to 320° C. over a 4 hour period, and the polymerization was finalized under vacuum (0.8 mm. Hg) for 30 minutes at 320° C. The ground polymer was solid state polymerized by heating under a flowing nitrogen atmosphere from 160° C. to 215° C. over a three day period. The polymeric product following such solid state polymerization exhibited a second order transition temperature of 100° C. and an inherent viscosity of 1.77 dl./gram.

The polymeric product next was subjected to a second solid phase polymerization treatment by heating under a flowing nitrogen atmosphere for 1 hour at 100° C., 1 hour at 150° C., 14 hours at 200° C., 15 hours at 210° C., and 5 hours at 230° C. After four hours of washing with acetone in a Soxhlet extractor, the polymer was air dried, and found to exhibit an inherent viscosity of 2.71 dl./gram, a second order transition temperature of 100° C., and large endothermic transitions at 272° C., 280° C., and 287° C.

The resulting polyester exhibited an anisotropic melt phase at a minimum temperature of approximately 250° C.

The wholly aromatic polyester of the present invention while at a relatively low temperature of 320° C. was melt extruded through a spinneret provided with a single hole jet having a diameter of 7 mils and a length of 10 mils. The take-up speed of the monofilament was 234 meters/minute.

The resulting as-spun wholly aromatic polyester fiber exhibited a denier per filament of 5.4 and the following average single filament properties:

| | |
|---|---|
| Tenacity (grams per denier) | 5.0 |
| Modulus (grams per denier) | 509 |
| Elongation (percent) | 1.18 |

A portion of fiber was heat treated under a nitrogen flow of 450 ml./minute wherein it was heated from room temperature to 150° C. for 1 hour, from 150° C. to 235° C. for 12 hours, and at 235° C. for 12 hours. The product exhibited the following average single filament properties:

| | |
|---|---|
| Tenacity (grams per denier) | 14.4 |
| Modulus (grams per denier) | 658 |
| Elongation (percent) | 2.5 |

Another portion of the fiber which had not previously been heat treated was heat treated under a nitrogen flow of 2 liters/minute wherein it was heated from room temperature to 250° C. over a period of 30 hours. The product exhibited the following average single filament properties:

| | |
|---|---|
| Tenacity (grams per denier) | 17.3 |
| Modulus (grams per denier) | 610 |
| Elongation (percent) | 3.59 |

EXAMPLE IV

Example I was substantially repeated with the exceptions indicated below.

To a three-neck round flask equipped with a stirrer, nitrogen inlet tube, and a distillation head connected to a condenser were added the following:
(a) 54.1 g. of p-acetoxybenzoic acid,
(b) 12.2 g. of 2,6-dihydroxynaphthalene diacetate,
(c) 16.2 g. of 2,6-dihydroxyanthraquinone diacetate,
(d) 16.6 g. of terephthalic acid, and
(e) 0.005 g. of sodium acetate (catalyst).

The reactants were gradually heated under nitrogen from 250° C. to 320° C. over a 4¼ hour period, and the polymerization was finalized under vacuum (0.5 Torr) for 30 minutes at 320° C. The polymeric product had an endothermic transition at 253° C. when observed by differential scanning calorimetry, and an inherent viscosity of 2.38 dl./gram. The ground polymeric product was solid state polymerized by heating under a flowing nitrogen atmosphere according to the following schedule: from 110° C. to 180° C. over 3 hours, from 180° C. to 200° C. over 16 hours, and from 200° C. to 230° C. over 32 hours. The polymeric product following such solid state polymerization exhibited a second order transition temperature of 105° C., formed an anisotropic melt at a minimum temperature of 250° C., when observed by differential scanning calorimetry exhibited a large endothermic transition at 289° C., and possessed an inherent viscosity of 6.38 dl./gram.

The wholly aromatic polyester while at a relatively low temperature of 300° C. was melt extruded through a spinneret provided with a single hole jet having a diameter of 7 mils and a length of 10 mils. The take-up speed of the monofilament was 100 meters/minute.

The resulting as-spun wholly aromatic polyester fiber exhibited a denier per filament of 16.2 and the following average single filament properties:

| | |
|---|---|
| Tenacity (grams per denier) | 9.11 |
| Modulus (grams per denier) | 543 |
| Elongation (percent) | 2.03 |

A portion of the fiber was heat treated under a nitrogen flow for 15 hours at 250° C. The product exhibited the following average single filament properties:

| | |
|---|---|
| Tenacity (grams per denier) | 20.1 |
| Modulus (grams per denier) | 732 |
| Elongation (percent) | 3.0 |

EXAMPLE V

Example I was substantially repeated with the exceptions indicated below:

To a three-neck round flask equipped with a stirrer, nitrogen inlet tube, and a distillation head connected to a condenser were added the following:
(a) 27.0 g. of p-acetoxybenzoic acid,
(b) 21.4 g. of 2,6-dihydroxynaphthalene diacetate,
(c) 28.4 g. of 2,6-dihydroxyanthraquinone diacetate,
(d) 29.1 g. of terephthalic acid, and
(e) 0.011 g. of sodium acetate (catalyst).

The polymerization reaction was carried out under nitrogen within the temperature range of 250° C. to 320° C. for approximately 5 hours, and the polymerization was finalized under vacuum (0.5 Torr) for 30 minutes at 320° C. The polymeric product had an endothermic transition at 361° C. when observed by differential scanning calorimetry, and an inheret viscosity of 3.06 dl./gram. The ground polymer product was solid state polymerized as described in Example IV. The polymeric product following such solid state polymerization exhibited a second order transition temperature of 113° C., formed an anisotropic melt at a minimum temperature of 300° C., when observed by differential scanning calorimetry exhibited an endothermic transition at 364° C., and possessed an inherent viscosity of 3.46 dl./gram.

The wholly aromatic polyester while at a temperature of 360° C. was melt extruded through a spinneret provided with a single hole jet having a diameter of 7 mils and a length of 10 mils. The take-up speed of the monofilament was 1938 meters/minute. For comparative purposes a similarly formed polyester, wherein the 2,6-dioxyanthraquinone moiety is omitted and the 2,6-dioxynaphthalene moiety is doubled on a molar basis, requires a melt extrusion temperature of approximately 380° C.

The resulting as-spun wholly aromatic polyester fiber of the present invention exhibited a denier per filament of 2.2 and the following average single filament properties:

| | |
|---|---|
| Tenacity (grams per denier) | 5.5 |
| Modulus (grams per denier) | 530 |
| Elongation (percent) | 1.22 |

EXAMPLE VI

Example I was substantially repeated with the exceptions indicated below.

To a three-neck round bottom flask equipped with a stirrer, nitrogen inlet tube, and a distillation head connected to a condenser were added the following:

(a) 63.1 g. of p-acetoxybenzoic acid,
(b) 9.16 g. of 2,6-dihydroxynaphthalene,
(c) 12.16 g. of 2,6-dihydroxyanthraquinone, and
(d) 12.46 g. of terephthalic acid.

The polymerization reaction was carried out under nitrogen within the temperature range of 250° C. to 320° C. for 5 hours, and the polymerization was finalized under vacuum (0.5 Torr) for 30 minutes at 320° C.

The polymeric product had an endothermic transition at 281° C. when observed by differential scanning calorimetry, and an inherent viscosity of 2.37 dl./gram. The ground polymer product was solid state polymerized as described in Example IV. The polymeric product following such solid state polymerization exhibited a second order transition temperature of 95° C., formed an anisotropic melt at a minimum temperature of 295° C., when observed by differential scanning calorimetry exhibited endothermic transitions at 282° C. and 298° C., and possessed an inherent viscosity of 2.54 dl./gram.

The resulting wholly aromatic polyester while at a temperature of 315° C. was melt extruded through a spinneret provided with a single hole jet having a diameter of 7 mils and a length of 10 mils. The take-up speed for the monofilament was 273 meters/minute. For comparative purposes a similarly formed polyester, wherein the 2,6-dioxyanthraquinone moiety is omitted and the 2,6-dioxynaphthalene moiety is doubled on a molar basis, requires a melt extrusion temperature of approximately 380° C.

The resulting as-spun wholly aromatic polyester fiber of the present invention exhibited a denier per filament of approximately 4.32 and the following average single filament properties:

| | |
|---|---|
| Tenacity (grams per denier) | 2.2 |
| Modulus (grams per denier) | 461 |
| Elongation (percent) | 0.49 |

Although the invention has been described with preferred embodiments it is to be understood that variations and modifications may be employed without departing from the concept of the invention as defined in the following claims.

We claim:

1. A melt processable wholly aromatic polyester capable of forming an anisotropic melt phase consisting essentially of the recurring moieties I, II, III, and IV having the structural formulas wherein:

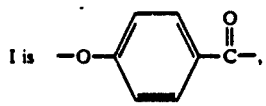

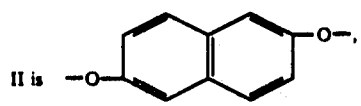

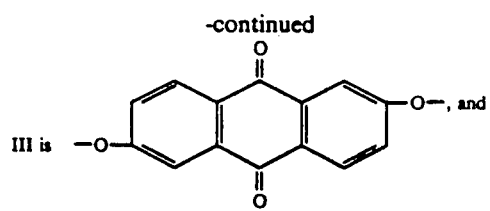

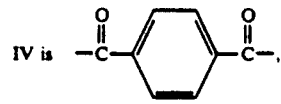

wherein said wholly aromatic polyester is substantially free of aromatic rings possessing ring substitution and meta disposed linkages in the polymer chain, wherein said wholly aromatic polyester comprises approximately 20 to 80 mole percent of moiety I, approximately 5 to 20 mole percent of moiety II, approximately 5 to 20 mole percent of moiety III, and approximately 10 to 40 mole percent of moiety IV, and wherein said wholly aromatic polyester can be melt processed at a lower minimum temperature when compared to a similarly formed wholly aromatic polyester wherein moiety III is omitted and is replaced by an additional concentration of moiety II which corresponds to the concentration of moiety III.

2. A melt processable wholly aromatic polyester according to claim 1 which is capable of forming an anisotropic melt phase below approximately 300° C.

3. A melt processable wholly aromatic polyester according to claim 1 which is capable of forming an anisotropic melt phase below approximately 290° C.

4. A melt processable wholly aromatic polyester according to claim 1 which exhibits an inherent viscosity of approximately 2 to 8 dl./gram when dissolved in a concentration of 0.1 percent by weight in pentafluorophenol at 60° C.

5. A melt processable wholly aromatic polyester according to claim 1 wherein the molar quantities of moieties II and III are substantially equal to each other.

6. A melt processable wholly aromatic polyester according to claim 1 wherein the total molar quantity of moieties II and III is substantially equal to that of moiety IV.

7. A melt processable wholly aromatic polyester according to claim 1 wherein the molar quantities of moieties II and III are substantially equal to each other and the total molar quantity of moieties II and III is substantially equal to that of moiety IV.

8. A molded article comprising the melt processable wholly aromatic polyester of claim 1.

9. A molding compound comprising the melt processable wholly aromatic polyester of claim 1 which incorporates approximately 1 to 60 percent by weight of a solid filler and/or reinforcing agent.

10. A fiber which has been melt spun from the wholly aromatic polyester of claim 1.

11. A melt processable wholly aromatic polyester capable of forming an anisotropic melt phase consisting essentially of the recurring moieties I, II, III, and IV having the structural formulas wherein:

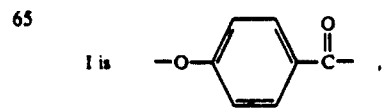

-continued

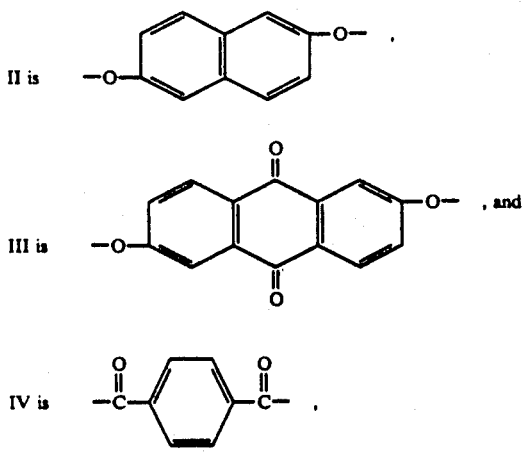

wherein said wholly aromatic polyester is substantially free of aromatic rings possessing ring substitution and meta disposed linkages in the polymer chain, wherein said wholly aromatic polyester comprises approximately 40 to 60 mole percent of moiety I, approximately 10 to 15 mole percent of moiety II, approximately 10 to 15 mole percent of moiety III, and approximately 20 to 30 mole percent of moiety IV, and wherein said wholly aromatic polyester can be melt processed at a lower minimum temperature when compared to a similarly formed wholly aromatic polyester wherein moiety III is omitted and is replaced by an additional concentration of moiety II which corresponds to the concentration of moiety III.

12. A melt processable wholly aromatic polyester according to claim 11 which is capable of forming an anisotropic melt phase below approximately 300° C.

13. A melt processable wholly aromatic polyester according to claim 11 which is capable of forming an anisotropic melt phase below approximately 290° C.

14. A melt processable wholly aromatic polyester according to claim 11 wherein the molar quantities of moieties II and III are substantially equal to each other.

15. A melt processable wholly aromatic polyester according to claim 11 wherein the total molar quantity of moieties II and III is substantially equal to that of moiety IV.

16. A melt processable wholly aromatic polyester according to claim 11 wherein the molar quantities of moieties II and III are substantially equal to each other and the total molar quantity of moieties II and III is substantially equal to that of moiety IV.

17. A melt processable wholly aromatic polyester according to claim 11 which comprises approximately 40 mole percent of moiety I, approximately 15 mole percent of moiety II, approximately 15 mole percent of moiety III, and approximately 30 mole percent of moiety IV.

18. A melt processable wholly aromatic polyester according to claim 11 which comprises approximately 60 mole percent of moiety I, approximately 10 mole percent of moiety II, approximately 10 mole percent of moiety III, and approximately 20 mole percent of moiety IV.

19. A melt processable wholly aromatic polyester according to claim 11 which exhibits an inherent viscosity of approximately 2 to 8 dl./gram when dissolved in a concentration of 0.1 percent by weight of pentafluorophenol at 60° C.

20. A molded article comprising the melt processable wholly aromatic polyester of claim 11.

21. A molding compound comprising the melt processable wholly aromatic polyester of claim 11 which incorporates approximately 1 to 60 percent by weight of a solid filler and/or reinforcing agent.

22. A fiber which has been melt spun from the wholly aromatic polyester of claim 11.

* * * * *